(12) United States Patent
Weber et al.

(10) Patent No.: US 9,193,611 B2
(45) Date of Patent: Nov. 24, 2015

(54) COMPOSITE MEMBRANES COMPRISING A SULFONATED POLYARYLETHER AND THEIR USE IN FORWARD OSMOSIS PROCESSES

(75) Inventors: Martin Weber, Maikammer (DE); Christian Maletzko, Altrip (DE); Volker Warzelhan, Weisenheim am Berg (DE); Natalia Widjojo, Singapore (SG); Tai-Shung Chung, Ann Arbor, MI (US)

(73) Assignees: BASF SE (DE); National University of Singapore, Singapore (SG)

( * ) Notice: Subject to any disclaimer, the term of this patent is extended or adjusted under 35 U.S.C. 154(b) by 613 days.

(21) Appl. No.: 13/457,682

(22) Filed: Apr. 27, 2012

(65) Prior Publication Data

US 2012/0273423 A1 Nov. 1, 2012

Related U.S. Application Data

(60) Provisional application No. 61/480,381, filed on Apr. 29, 2011.

(51) Int. Cl.
*C08G 14/00* (2006.01)
*C02F 1/44* (2006.01)
*B01D 67/00* (2006.01)
*B01D 69/10* (2006.01)
(Continued)

(52) U.S. Cl.
CPC ............ *C02F 1/445* (2013.01); *B01D 67/0006* (2013.01); *B01D 67/0009* (2013.01); *B01D 69/10* (2013.01); *B01D 69/125* (2013.01); *B01D 71/56* (2013.01); *B01D 71/68* (2013.01); *B01D 71/80* (2013.01); *B01D 71/82* (2013.01); *B01D 61/002* (2013.01); *B01D 2323/40* (2013.01); *C02F 2103/08* (2013.01)

(58) Field of Classification Search
CPC ................. C08G 2261/516; C08G 2261/1452; C08G 2261/722; C08G 18/0828; H01B 1/122; H01M 8/1025; H01M 8/1027
USPC .......................... 528/516, 722, 125, 373, 370
See application file for complete search history.

(56) References Cited

U.S. PATENT DOCUMENTS

2004/0101730 A1* 5/2004 Hirano et al. ................... 429/33
2010/0197859 A1 8/2010 Weber et al.
(Continued)

FOREIGN PATENT DOCUMENTS

EP 1394879 A1 3/2004
WO WO-2008137082 A1 11/2008
(Continued)

OTHER PUBLICATIONS

Yip et al. (Environ. Sci. Technol. 2010, 44, 3812-3818).*
(Continued)

*Primary Examiner* — Shane Fang
(74) *Attorney, Agent, or Firm* — Drinker Biddle & Reath LLP

(57) ABSTRACT

The present invention is directed to thin film composite membrane (TFC membrane) comprising a substrate layer (S) based on a sulfonated polymer, e.g. a sulfonated polyarylether, and a polyamide film layer (F) and further to a method for their preparation. Furthermore, the present invention is directed to osmosis processes, in particular to forward osmosis (FO) processes, using said membrane.

14 Claims, 2 Drawing Sheets

── 20 μm

── 1 μm (51) Int. Cl.
  *B01D 69/12* (2006.01)
  *B01D 71/56* (2006.01)
  *B01D 71/68* (2006.01)
  *B01D 71/80* (2006.01)
  *B01D 71/82* (2006.01)
  B01D 61/00 (2006.01)
  C02F 103/08 (2006.01)

(56) References Cited

U.S. PATENT DOCUMENTS

2012/0043274 A1 2/2012 Chi et al.
2012/0083541 A1 4/2012 Khvorost et al.
2012/0083579 A1 4/2012 Weber et al.

FOREIGN PATENT DOCUMENTS

WO WO-2009030620 A1 3/2009
WO WO-2010/142585 A1 12/2010
WO WO-2010/146052 A1 12/2010

OTHER PUBLICATIONS

International Search Report for PCT/EP2012/057591, Jul. 18, 2012.
Wang, K., et al., "Developing Thin-Film-Composite Forward Osmosis Membranes on the PES/SPSf Substrate Through Interfacial Polymerization", AICHE Journal, vol. 58, No. 3, (2011), pp. 770-781.

* cited by examiner

COMPOSITE MEMBRANES COMPRISING A SULFONATED POLYARYLETHER AND THEIR USE IN FORWARD OSMOSIS PROCESSES

CROSS REFERENCE TO RELATED APPLICATIONS

This application claims benefit (under 35 USC 119(e)) of U.S. Provisional Application 61/480,381, filed Apr. 29, 2011, which is incorporated by reference.

BACKGROUND OF THE INVENTION

The present invention is directed to thin film composite membranes (TFC membranes) comprising a substrate layer (S) based on a sulfonated polymer, e.g. a sulfonated polyarylether, and a polyamide film layer (F) and further to a method for their preparation. Furthermore, the present invention is directed to osmosis processes, in particular to forward osmosis (FO) processes, using said membrane.

The development and application of membrane technologies (e.g. dialysis, membrane filtration such as nano-, ultra- and micro-filtration and osmosis processes) is one of the most significant recent advances in chemical, environmental, and biological process engineering.

In view of global water scarcity, particularly in drought-prone and environmentally polluted areas, one of the most important applications of osmosis processes using semi-permeable osmosis membrane is the purification of waste water or seawater. Considerable efforts have been put in providing novel methods of purifying wastewater or seawater at lower expenditure with less energy consumption. In this context, membrane based purification and separation processes have become more attractive in comparison to distillation processes.

Generally, the term osmosis describes a diffusion process, wherein solvent molecules move through a selectively permeable membrane (i.e. permeable to solvent but not to solute), which is separating at least two solutions of different solute concentration, into a solution with higher solute concentration. This diffusion process aims for equalization of the solute concentrations. The selectively permeable membrane used in osmosis process is also referred to as "semi-permeable" membrane or osmosis membrane.

Normally, osmosis membranes exhibit a molecular weight cut off (MWCO) in the range from 10 to 500 Da. The molecular weight cut off (MWCO) refers to the lowest molecular weight (given in Daltons) in which al least 80%, preferably at least 90%, of solute molecules are retained by the membrane.

In general, there are two osmosis process modes used in technical applications, namely the reversed osmosis (RO) and the forward osmosis (FO), wherein both osmosis processes utilize a selectively permeable membrane to separate water from dissolved solute molecules or ions.

In the case of reversed osmosis (RO), a hydraulic pressure as the driving force for the separation is employed, wherein the solute retains on the pressurized side of the membrane and the solvent passes through the membrane to the other side. The forward osmosis (FO) employs the osmotic pressure as a driving force generated by a highly concentrated solution (so called "draw solution") to allow water to diffuse through a semi-permeable membrane from the so called "feed solution" (e.g. brackish water or seawater), which has a relatively lower salt concentration.

Forward osmosis (FO) offers some advantages over the reversed osmosis (RO) and thermal separation processes. For example, forward osmosis (FO) can operate without high hydraulic pressures which are necessary in the reverse osmosis process and high temperatures which are necessary in the distillation and may be detrimental to the feed solution. Less energy is required for the FO process compared to other separation processes. The forward osmosis also offers the advantages of high rejection of a wide range of contaminants and lower membrane-fouling than traditional reversed osmosis processes.

It is known in the state of art that FO membranes can be utilized for example for water reuses, seawater desalination and concentration of pharmaceutical solution. The major problems in use of forward osmosis today are e.g. the limited number of commercially available FO membranes, insufficient water permeation and separation performance of known FO membranes and the lack of desirable draw solutions depended on the intended use of osmosis product.

Membranes, which are designed for reversed osmosis processes can often not be applied in the forward osmosis process due to their thick and dense support layer, which is necessitated to withstand high pressure in the reversed osmosis process and which causes decreased water flux and high salt leakage in the FO process. In this regard, an effective support layer (substrate layer) for FO membranes should be as thin as possible, highly porous, and provide a direct path from the draw solution to the active surface of the membrane.

In state of art several flat several sheet membranes based on cellulose triacetate (CTA) suitable for forward osmosis are known. They are used in applications of water purification for military, emergency relief, and recreational purposes (see T. Y. Cath, A. E. Childress, M. Elimelech, "Forward osmosis: Principles, applications, and recent developments". J. Membr. Sci. 281 (2006) 70). These cellulose triacetate membranes exhibit a low pure water permeability and salt rejection.

The publication Yip et al. (M. Elimelech, "High Performance thin-film composite forward osmosis membranes", Environ. Sci. Technol. 44 (3812) 2010) describes thin film composite (TFC) membranes comprising a polysulfone support for forward osmosis application. However, said support layer substrate consists of finger like macrovoid which may reduce the membrane integrity in the long term process of use in osmosis processes, in particular in forward osmosis processes.

The use of polyarylethers and sulfonated polyarylethers for the production of membranes, such as dialysis membranes or membranes in fuel cells, is described in the state of art. Document WO 2009/030620 describes blends of branched polyarylethers and hydrophilic polymers for production of hollow fiber membranes used as dialysis filters. The document WO 2010/142585 describes aromatic polyarylenether block copolymers and their use for the production of polyelectrolyte membranes for fuel cells or for water treatment.

However, there is a high permanent need of novel, superior forward osmosis membrane systems suitable for several applications, which shows high water flux, sufficient salt rejection and excellent chemical and mechanical resistance. Also long-term stability is an important feature.

A SUMMARY OF THE INVENTION

One object of the invention is to provide novel membranes suitable in particular forward osmosis (FO) processes which can overcome the disadvantages of the state of art, in particular having superior properties (e.g. high water flux) in use for forward osmosis.

It was surprisingly found that the composite membrane comprising a high content of sulfonated polymer in the substrate layer exhibit a structure having the following advantageous characteristics:
open-cell with interconnected porous structure;
no macrovoid and
hydrophilic structure.

The present invention is directed to a composite membrane comprising (preferably composed of):
a) at least one substrate layer (S) comprising (or consisting of)
  i) at least one sulfonated polymer P1, which comprises from 2 to 40 wt %, preferably from 5 to 40 wt %, more preferably 5 to 30 wt % based on the total weight of the polymer P1, of recurring units comprising at least one sulfonic acid group;
  ii) at least one polymer P2;
    wherein the sulfonated polymer P1 and the polymer P2 are independently selected from the group consisting of polyarylether, polyethersulfone (PESU), polyphenylensulfone (PPSU), polysulfone (PSU), polyacrylonitrile (PAN), polybenzimidazole (PBI), polyetherimide (PEI); polyphenyleneoxide (PPO), polyvinylidenfluoride (PVDF), polyimide (PI), and copolymers composed of at least two recurring units of said polymers;
b) at least one film layer (F) comprising (or consisting of) at least one polyamide.

The polymers P1 and P2 are not the same polymers. In particular, the polymer P2 is an unsulfonated polymer. An unsulfonated polymer in terms of the present invention is a polymer which does not comprise sulfonic acid groups in its recurring units.

A sulfonated polymer P1 in terms of the present invention is a polymer which comprises sulfonated recurring units and unsulfonated recurring units, wherein amount of sulfonated recurring units (based on the weight of copolymer P1) is in the range of 2 to 40 wt %, preferably from 5 to 40 wt %, more preferably 5 to 30 wt %.

The composite membrane shows the following desired characteristics, which are in particular important for use in forward osmosis process:
thin membrane with sufficient or high chemical and mechanical stability (e.g. suitable using in pressure retarded osmosis);
substrate layer (S) with minimum porosity, macrovoid-free structure and high hydrophilicity;
enhanced water flux and reduced membrane fouling;
nearly defect-free semi-permeable active layer for high solute rejection.

The inventive membrane (thin film composite (TFC) membrane) is particularly suitable for forward osmosis applications.

The newly developed membranes are designed particularly for seawater desalination, water reclamation from wastewaters, the osmotic concentration of food and pharmaceutical solutions via forward osmosis processes.

The hydrophilic and macrovoid free membrane substrate layer (S) of the inventive composite membrane can enhance the membrane integrity. Further, the macrovoid-free structure and high content of the sulfonated copolymers on the membrane substrate layer (S) results in superior improved water flux and low salt leakage. In addition, the membrane fouling will be reduced in particular due to the hydrophilic nature of thin film layer (F) and substrate layer (S).

The term "macrovoid" in terms of the present invention means pores (e.g. elongated pores) with a pore size of more than 10 micrometer (>10 micrometer). Macrovoids can often be found in asymmetric polymeric membranes prepared via phase-inversion techniques.

In particular, the inventive composite membrane comprises at least one substrate layer (S) comprising
  i) 5 to 95 wt %, preferably 25 to 75 wt %, of at least one sulfonated polymer P1; and
  ii) 5 to 95 wt %, preferably 25 to 75 wt %, of at least one polymer P2.

In a preferred embodiment, the at least one sulfonated polymer P1 and/or the at least one polymer P2 are polyarylethers comprising (or composed of) recurring units according to following formula (1):

$$\mathrm{+O-Ar+T-\bigcirc_{\!\!\!t}\!\!-O-\bigcirc-Z+Ar^{1}\text{-}Q\!\!\!\!+_{\!\!q}\bigcirc\!\!\!\!+_{\!\!x}} \quad (1)$$

wherein:
  x is 0.5 or 1;
  t and q are each, independently of one another, 0, 1, 2 or 3;
  Q, T, Z are each, independently of one another, a chemical bond or a group selected from among —O—, —S—, —SO$_2$—, S═O, C═O, —N═N—, —R$^a$C═CR$^b$— and —CR$^c$R$^d$—, where
    R$^a$ and R$^b$ are each, independently of one another, a hydrogen atom or a C$_1$-C$_{12}$-alkyl group and
    R$^c$ and R$^d$ are each, independently of one another, a hydrogen atom or a C$_1$-C$_{12}$-alkyl, C$_1$-C$_{12}$-alkoxy or C$_6$-C$_{18}$-aryl group, where R$^c$ and R$^d$ are optionally substituted independently by fluorine and/or chlorine atoms or may together with the carbon atom to which they are bound form a C$_3$-C$_{12}$-cycloalkyl group which is optionally substituted by one or more C$_1$-C$_6$-alkyl groups;
  with the proviso that at least one of the groups T, Q and Z is —SO$_2$— or C═O and, when t and q are each 0, Z is —SO$_2$— or C═O,
  Ar, Ar$^1$ are each, independently of one another, a C$_6$-C$_{18}$-arylene group which is optionally substituted by one or more groups selected from C$_1$-C$_{12}$-alkyl, C$_6$-C$_{18}$-aryl, C$_1$-C$_{12}$-alkoxy group, halogen atom and sulfonic acid group.

In a further preferred embodiment the polymer P1 and/or polymer P2 are polyethersulfones (PESU) (also referred to as polyarylethersulfone). Preferably, the at least one sulfonated polymer P1 and/or the at least one polymer P2 are polyethersulfones (PESU) comprising, preferably composed of, recurring units according to following formula (1):

$$\mathrm{+O-Ar+T-\bigcirc_{\!\!\!t}\!\!-O-\bigcirc-Z+Ar^{1}\text{-}Q\!\!\!\!+_{\!\!q}\bigcirc\!\!\!\!+_{\!\!x}} \quad (1)$$

wherein:
  x is 0.5 or 1;
  t and q, are each, independently of one another, 0, 1, 2, or 3;
  Q, T, Z are each, independently of one another, a chemical bond or a group, selected from —O—, —S—, —SO$_2$—, S═O, C═O, —N═N—;

with the proviso that at least one of the groups T, Q, and Z is —SO$_2$— and, if t and q are 0, Z is —SO$_2$—, and Ar, Ar$^1$ are each, independently of one another, a C$_6$-C$_{13}$-arylene group which is optionally substituted by one or more groups selected from C$_1$-C$_{12}$-alkyl, C$_6$-C$_{18}$-aryl, C$_1$-C$_{12}$-alkoxy group, halogen atom and sulfonic acid group.

Further preference is given to the use of polyethersulfone (PESU) which comprises (or is composed of) recurring units of the above mentioned formula (1), wherein x is 0, 5 or 1;

t and q, are each, independently of one another, 0, 1, or 2;

Q, T, Z are each, independently of one another, a chemical bond or a group, selected from —O— and —SO$_2$—;

with the proviso that at least one of the groups T, Q, and Z is —SO$_2$— and, if t and q are 0, Z is —SO$_2$—, and Ar, Ar$^1$ are each, independently of one another, a C$_6$-C$_{12}$-arylene group, which is optionally substituted by one or more sulfonic acid groups.

Further preference is given to the use of polyethersulfone (PESU) which comprises (or is composed of) units according to the following formula (2):

(2)

Further preference is given to the use of polyethersulfone (PESU) which comprises (or is composed of) recurring units according to the following formula (3):

(3)

In a further embodiment the polymer P1 and/or P2 are polyphenylenesulfone (PPSU) comprising (or composed of) recurring units according to formula (4)

(4)

wherein

R$^1$ is C=O or —SO$_2$—;

Ar is a divalent aromatic radical.

The radical Ar can also have a meaning as given in EP-A-1 394 879 for the structures of the general formula (2) in this document.

R$^1$ is preferably —SO$_2$—.

Preferably the polymer P1 and/or P2 are polyphenylenesulfone (PPSU) comprising (or composed of) recurring units according to formula (5):

(5)

wherein

R$^1$ is C=O or —SO$_2$—;

Ar is a divalent aromatic radical.

The aromatic radical Ar is preferably a polycyclic aromatic radical, preferably a biphenyl radical of the general formula (6)

(6)

In the biphenyl radical of the general formulae (4) and (5), the phenyl groups can also be connected via a —C(CH$_3$)$_2$— group.

In a further embodiment the polymer P1 and/or P2 are polysulfone (PSU) comprising (or composed of) recurring units according to following formula (7):

(7)

wherein:

R$^{2a}$, R$^{2b}$ are each, independently of one another, H, C$_1$-C$_6$-alkyl, or —(CH$_2$)$_p$—COOH, wherein p is an integer from 0 to 6;

Ar$^2$, Ar$^3$ are each, independently of one another, a C$_6$-C$_{18}$-arylene group which is optionally substituted by one or more groups selected from C$_1$-C$_{12}$-alkyl, C$_6$-C$_{18}$-aryl, C$_1$-C$_{12}$-alkoxy group, halogen atom and sulfonic acid group; and Y is —SO$_2$—.

Preference is given to recurring units of the formula (7), wherein

R$^{2a}$, R$^{2b}$ are each, independently of one another, H or C$_1$-C$_4$-alkyl;

Ar$^2$, Ar$^3$ are each, independently of one another, a C$_6$-C$_{12}$-arylene group which is optionally substituted by one or more sulfonic acid groups, and Y is —SO$_2$—.

Preferably a polysulfone (PSU) obtained from polycondensation of bisphenol A and 4,4'-dichlorodiphenylsulfone is used in the present invention. Preferably said polysulfone is used as at least one polymer P2.

In a further embodiment the polymer(s) P1 and/or P2 are polyacrylonitrile (PAN) comprising (or composed of) recurring units according to the following formula (8):

(8)

In a further embodiment the polymer(s) P1 and/or P2 are polybenzimidazole (PBI), which can obtained from reaction (polycondensation) of 3,3",4,4"-tetra amine diphenylen and isophthalic acid.

In a further embodiment the polymer(s) P1 and/or P2 are polyetherimide (PEI), which can be obtained from reaction (polycondensation) of bisphthalic acid anhydride and 1,3-diamino benzene or N-phenyl-4-nitrophthalimide and disodium salt of bisphenol A.

In a further embodiment the polymer(s) P1 and/or P2 are polyphenyleneoxide (PPO) (also referred to as polyphenylenether PPE) comprising (or composed of) recurring units according to the following formula (9):

(9)

In a further embodiment the polymer(s) P1 and/or P2 are polyvinylidenfluoride (PVDF) comprising (or composed of) recurring units according to the following formula (10):

(10)

In a further embodiment the polymer(s) P1 and/or P2 are polyimide (PI) comprising (or composed of) recurring units according to the following formula (11):

(11)

wherein R can be an aliphatic or aromatic substituted or unsubstituted radical. Polyimides are preferably produced by polycondensation of dianhydride, e.g. a dianhydride of a tetracarbocylic acid, and a diamine. Preference is given to aromatic poly-imides. For example a polyimide is used which is produced from pyromellitic dianhydride and 4,4'-oxodianiline.

In the following preferred embodiments of sulfonated polymer P1 are described.

Preferably the at least one sulfonated polymer P1 is a sulfonated polymer selected from the group consisting of polyarylether, polyethersulfone (PESU), polyphenylensulfone (PPSU), polysulfone (PSU), polyacrylonitrile (PAN), polybenzimidazole (PBI), polyetherimide (PEI); polyphenyleneoxide (PPO), polyvinylidenfluoride (PVDF), polyimide (PI) and copolymers composed of at least two recurring units of said polymers, wherein the polymers are defined as above. More preferably the at least one sulfonated polymer P1 is a sulfonated polymer selected from the group consisting of polyarylether, polyethersulfone (PESU), polyphenylensulfone (PPSU), polysulfone (PSU), and copolymers composed of at least two recurring units of said polymer, wherein the polymers are defined as described above.

Preference is given to sulfonated polymers P1 wherein the polymer comprises recurring units comprising at least one sulfonic acid group (—SO$_3$H). Preferably, the at least one sulfonic acid group is directly attached to an aromatic ring. According to the present invention the at least one sulfonated polymer P1 comprises typically from 2 to 40 wt %, preferably from 5 to 40 wt %, more preferably 5 to 30 wt %, based on the total weight of polymer P1, of recurring units comprising at least one sulfonic acid group.

A skilled person knows that the sulfonic acid groups may be in form of free acid —SO$_3$H or in deprotonated form in dependency of the conditions.

In particular, the at least one sulfonated polymer P1 is a polyarylether comprising, preferably composed of, recurring units according to formula (1) as defined above, wherein Ar and Ar$^1$ are each, independently of one another, a biphenyl group of the general formula (6):

(6)

which is substituted by one or more sulfonic acid group.

Further preference is given to sulfonated copolymers comprising at least two recurring units as described above, wherein the copolymers may be random copolymers or block copolymers. Preference is given to use of block copolymers. Preferred copolymers for the use as sulfonated polymer P1 in the context of the present invention are described in WO 2010/146052 and EP-A 1 394 879.

The preparation of sulfonated copolymers P1 can be carried out via direct sulfonation in the monomer or post sulfonation method of an unsulfonated polymer or copolymer as described e.g. in WO 2010/146052.

In a preferred embodiment of the invention the at least one sulfonated polymer P1 is a block copolymer comprising at least one polyethersulfone (PESU) segment and at least one polyphenylensulfone (PPSU) segment according to following formula (12):

(12)

wherein:

n is an integer from 3 to 1500; preferably from 5 to 500;

m is an integer from 3 to 1500, preferably from 5 to 500;

a and b independently of each other, are an integer from 0 to 2, with the proviso that not both a and b are 0.

The sulfonated polymer P1 can also be a copolymer comprising recurring units according to the above formula (12), wherein the recurring units are randomly distributed.

The sulfonated polymer P1 used according to the present invention can be obtained by sulfonation (e.g. using concentrated sulfuric acid) of at least one of the above described polymers selected from polyarylether, polyethersulfone (PESU), polyphenylensulfone (PPSU), polysulfone (PSU), polyacrylonitrile (PAN), polybenzimidazole (PBI), polyetherimide (PEI), polyphenyleneoxide (PPO), polyvinylidenfluoride (PVDF), polyimide (PI), and copolymers composed of at least two recurring units of said polymers. The sulfonated polymer P1 can be prepared by firstly prepared polymer, e.g. block copolymer comprising PESU and PPSU units, and subsequently selectively sulfonated by means of concentrated aqueous sulfuric acid (about 98% strength).

Preferably, the at least one sulfonated copolymer P1 comprises sulfonated recurring units and unsulfonated recurring units, wherein amount of sulfonated recurring units (based on the weight of copolymer P1) is in the range of 2 to 40 wt %, preferably from 5 to 40 wt %, more preferably 5 to 30 wt %.

In a preferred embodiment the at least one sulfonated polymer P1 is a copolymer comprising at least one polymer based on polyarylether, polyethersulfone (PESU), polyphenylensulfone (PPSU), polysulfone (PSU), polyacrylonitrile (PAN), polybenzimidazole (PBI), polyetherimide (PEI); polyphenyleneoxide (PPO), polyvinylidenfluoride (PVDF), polyimide (PI), and copolymers composed of at least two recurring units of said polymers, wherein said polymer(s) comprise 2 to 40 wt %, preferably from 5 to 40 wt %, more preferably 5 to 30 wt %, based on total weight of copolymer P1 sulfonated recurring units. More preferably the at least one sulfonated copolymer P1 comprises at least one polymer based on polyethersulfone (PESU), polyphenylenesulfone (PPSU), polysulfone (PSU), wherein said polymer(s) comprise 2 to 40 wt %, preferably from 5 to 40 wt %, more preferably 5 to 30 wt %, based on total weight of copolymer P1 sulfonated recurring units.

In an further preferred embodiment the sulfonated copolymer P1 is a block copolymer comprising segments of recurring units comprising at least one sulfonic acid group (sulfonated segment, hydrophilic segments) and segments of recurring units comprising no sulfonic acid groups (unsulfonated segment, hydrophobic segment), wherein the proportion by weight of hydrophilic segments is from 2 to 40 wt %, preferably from 5 to 40 wt %, more preferably 5 to 30 wt % by weight based on the total block copolymer.

The at least one sulfonated copolymer P1 is often a sulfonated block copolymer comprising at least one polyethersulfone (PESU) segment and at least one polyphenylenesulfone (PPSU) segment. Preferably the at least one polyphenylenesulfone (PPSU) segment comprises at least one sulfonic acid group.

Typically the polyphenylensulfone (PPSU) segment has the following chemical formula (13):

(13)

wherein $R^1$ is C=O or —SO$_2$—;

Ar is a divalent, aromatic radical; and m is an integer from 3 to 1500, preferably from 5 to 500.

The radical Ar can also have a meaning as given in EP-A 1 394 879 for the structures of the general formula (2) in EP-A 1 394 879. Preferably the aromatic radical Ar is substituted with at least one sulfonic acid group (—SO$_3$H).

$R^1$ is preferably —SO$_2$—.

Preferably the polyphenylensulfone (PPSU) segment have the following chemical formula (14):

(14)

wherein:

$R^1$ is C=O or —SO$_2$—;

Ar is a divalent, aromatic radical; and m is an integer from 3 to 1500, preferably from 5 to 500.

The aromatic radical Ar is preferably a polycyclic aromatic radical, preferably a biphenyl radical of the general formula (6)

(6)

In the biphenyl radical of the general formula (6), the phenyl groups can also be connected via a —C(CH$_3$)$_2$— group. Preferably the aromatic radical Ar is substituted with at least one sulfonic acid group (—SO$_3$H).

Typically, the polyethersulfone (PESU) segment have the following chemical formula (15):

(15)

wherein n is a integer from 3 to 1500.

Preferably, the polyethersulfone (PESU) segment have the following chemical formula (16):

(16)

wherein n is a integer from 3 to 1500.

Preferably, the block copolymers as described above are prepared using prepolymers which comprises above defined polyphenylensulfone (PPSU) segment or polyethersulfone (PESU) segment. Suitable aromatic dihalides and dihydric alcohols which can used as monomers for preparation of polymer P1 are mentioned in WO 2010/146052.

In the following preferred embodiments of polymer P2 are described:

Preferably the at least one polymer P2 is selected from the group consisting polyarylether, polyethersulfone (PESU), polyphenylensulfone (PPSU), polysulfone (PSU), polyacrylonitrile (PAN), polybenzimidazole (PBI), polyetherimide (PEI); polyphenyleneoxide (PPO), polyvinylidenfluoride (PVDF), polyimide (PI), and copolymers composed of at least two recurring units of said polymers, wherein the polymers are defined as above. More preferably the at least one polymer P2 is selected from polyarylether, polyethersulfone (PESU), polyphenylensulfone (PPSU), polysulfone (PSU), and copolymers composed of at least two recurring units of said polymer, wherein the polymers and the recurring units are defined as described above.

Preferably the at least one polymer P2 does not comprise sulfonated recurring units (recurring units with sulfonic acid group (s)).

Preferably the at least one polymer P2 is selected from polyarylether and/or polyethersulfone (PESU) according to formula (I) as defined above, wherein Ar, $Ar^1$ are each, independently of one another, a $C_6$-$C_{18}$-arylene group which is optionally substituted by one or more groups selected from $C_1$-$C_{12}$-alkyl, $C_6$-$C_{18}$-aryl, $C_1$-$C_{12}$-alkoxy group and halogen atom.

Preferably, the at least one polymer P2 is a polyethersulfone (PESU) composed of recurring units according to the following formula (3):

(3)

In particular the inventive composite membrane comprises 5 to 95 wt %, preferably 25 to 75 wt %, more preferably 35 to 55 wt % of at least one sulfonated polymer P1 based on weight of the polymers P1 and P2. Preferably the inventive composite membrane comprises more than 25 wt %, in particular more than 50 wt % of the sulfonated polymer P1 (based on the weight of polymers P1 and P2). In a preferred embodiment the invention is directed to a composite membrane as described above, wherein the weight ratio of sulfonated polymer P1 to polymer P2 is in the range from 0.4 to 1.5, preferably from 0.4 to 1, more preferably from 0.6 to 1.

Typically, the substrate layer (S) has a thickness in the range from 1 to 200 µm, preferably from 10 to 100 µm, more preferably from 10 to 50 µm.

The present invention is also directed to a composite membrane, which comprises at least one film layer (F) comprising (or consisting of) at least one polyamide, preferably an aromatic polyamide (aramid). Preferably the invention is directed to a composite membrane as described above, wherein the at least one polyamide is an aromatic polyamide (aramid), in which at least 85% of amide groups (CO—NH) are attached directly to two aromatic rings. Preferably the polyamide according to the present invention is polymetaphenylene isophtalamides (MPIA) and/or a poly-par-aphenylene terephtalamides (PPTA).

The film layer (F) can be obtained via reaction of at least one polyamine monomer having at least two amine groups, and at least one polyacylhalide monomer having at least two acyl halide groups on the surface of the substrate layer. Suitable polyamine monomer and polyacylhalide monomer are described below in connection with the method for preparation of composite membrane.

The film layer (F) has preferably a film thickness in the range from 10 to 500 nm, preferably from 50 to 300 nm, more preferably from 70 to 200 nm.

Furthermore, the present invention relates to a method for preparation of an inventive composite membrane, which comprises at least one substrate layer (S) and at least one film layer (F), comprising the following steps:
a) preparing a polymer composition (P) comprising:
   i) at least one sulfonated polymer P1, which comprises 2 to 40 wt % based on the total weight of polymer P1 recurring units comprising at least one sulfonic acid group;
   ii) at least one polymer P2;
   iii) at least one solvent S1, preferably selected from the group consisting of N-methylpyrrolidone, N-dimethylacetamide, dimethylsulfoxide, dimethylformamide, triethylphosphate, tetrahydrofuran, 1,4-dioxane and methylethyl ketone;
   iv) optional at least one further additive selected from the group consisting of ethylene glycol, diethylene glycol, polyethylene glycol, glycerol, methanol, ethanol, isopropanol, polyvinylpyrrolidon;
   wherein the sulfonated polymer P1 and the polymer P2 are independently selected from the group consisting of polyarylether, polyethersulfone (PESU), polyphenylensulfone (PPSU), polysulfone (PSU), polyacrylonitrile (PAN), polybenzimidazole (PBI), polyetherimide (PEI); polyphenyleneoxide (PPO), polyvinylidenfluoride (PVDF), polyimide (PI), and copolymers composed of at least two recurring units of said polymers;
b) separating the polymers P1 and P2 from the solvent S1 to form a substrate layer (S);
c) bringing the substrate layer (S) into contact with a composition A1 comprising at least one polyamine monomer having at least two amine groups and at least one solvent S2;
d) bringing the substrate layer (S) into contact with a composition A2 comprising at least one polyacylhalide monomer having at least two acyl halide groups and at least one solvent S3 to form a film layer (F) onto the substrate layer (S), wherein a composite membrane is obtained.

The above described method provides a reliable and easy method for preparation of forward osmosis membranes, wherein the obtained composite membranes exhibit superior properties in forward osmosis application, in particular improved water flux and sufficient or improved salt leakage and sufficient mechanical stability.

The polymer blends of sulfonated and unsulfonated polymers as membrane substrate layer (S) can induce hydrophilic property and achieve macrovoid free morphology while retaining membrane's mechanical strength. A high content of hydrophilic material from sulfonated copolymer (e.g. 50 wt % of total polymer composition) can be introduced in the substrate layer using the inventive method. The resultant TFC-FO membranes with macrovoid free morphology can achieve a high water flux in forward osmosis. In this regards, the new developed forward osmosis membranes shows great potentials to be applied in the seawater desalination, waste water treatment, pharmaceutical and juice concentration, power generation as well as potable water reuse in space.

Step a of the inventive method is directed to preparation of a polymer composition (P). Preferred embodiments of at least one sulfonated polymer P1 and at least one polymer P2 are described above in connection with inventive membrane.

The at least one solvent S1 is particularly selected from the group consisting of N-methylpyrrolidone, N-dimethylacetamide, dimethylsulfoxide, dimethylformamide, triethylphosphate, tetrahydrofuran, 1,4-dioxane and methyl ethyl ketone, preferably the at least solvent S1 is N-methylpyrrolidone.

Preferably the present invention is directed to a method for preparation of a composite membrane as described above, wherein the polymer composition (P) comprises:
i) 2.5 to 22.5 wt %, preferably from 2.5 to 15 wt %, of at least one sulfonated polymer P1;
ii) 2.5 to 15 wt % of at least one polymer P2;
iii) 62.5 to 95 wt %, preferably from 70 to 95 wt %, preferably from 50 to 95 wt, of at least one solvent S1 selected from the group consisting of N-methylpyrrolidone, N-dimethylacetamide, dimethylsulfoxide, dimethylformamide, triethylphosphate, tetrahydrofuran, 1,4-dioxane, and methyl ethyl ketone;
iv) optionally 0-30 wt %, preferably from 0.1 to 20 wt % of at least one further additive selected from the group consisting of ethylene glycol, diethylene glycol, polyethylene glycol, glycerol, methanol, ethanol, isopropanol and polyvinylpyrrolidon.

The weight percent given above in connection with the polymer composition (P) is based on the weight of whole polymer composition (P).

Preferably the sulfonated polymer P1 and the polymer P2 are used in a weight ratio (P1/P2) in the range from 0.4 to 1.5, preferably from 0.4 to 1, more preferably from 0.6 to 1.

Step b) of present invention is directed to separating the polymers P1 and P2 from the solvent S1 to form a substrate layer (S).

In a preferred embodiment the separating of the polymers P1 and P2 from the solvent S1 in step b is effected by:
applying the polymer composition (P) into a support;
adding a coagulation composition (C) comprising at least one $C_1$-$C_{12}$ aliphatic alcohol and/or water to the polymer composition (P) by forming the substrate layer (S).

In principle the form of composite membrane can vary, in which case the membrane is particularly present in form of a flat membrane or in form of a fiber, e.g. a hollow fiber. Preferably, the membrane according to the present invention is in form of flat membrane. When the method of the present invention is used to produce hollow fiber membranes, step b) is preferably conducted by means of wet spinning.

The coagulation composition used in the method is preferably a liquid which is fully miscible with the solvent S1 with the proviso that the polymers P1 and P2 are insoluble or partially insoluble in the coagulation composition (C). In particular the coagulation composition comprises (or preferably is composed of) at least one aliphatic $C_1$-$C_6$ alcohol or water or mixtures thereof. Preferably the coagulation composition comprises at least one liquid selected from the group consisting of water, methanol, ethanol and isopropanol. In a further preferred embodiment water is used as coagulation composition (C).

Step c) and d) of the present invention are directed to bringing the substrate layer (S) into contact with a composition A1 comprising at least one polyamine monomer and with a composition A2 comprising at least one polyacylhalide monomer to form a film layer (F) onto the substrate layer (S), wherein a composite membrane is obtained.

Preferably the step c) and d) of inventive method, in which the polyamide film layer (F) is formed, is carried out by so called interfacial polymerization. Interfacial polymerization can form an ultrathin active layer exhibiting high water flux. The interfacial polymerization reaction generally takes place very fast on the organic side, and produces a defect-free ultrathin film near the interface. As a result, the membrane production cost will be greatly reduced.

A polyamine monomer in terms of the present invention is a compound having at least two amine groups (preferably two or three amine groups). The polyamine monomer has typically at least two amine groups selected from primary or secondary amine groups. Preferably a polyamine monomer having at least two primary amine groups is employed in the inventive method.

In one embodiment, the at least one polyamine monomer is selected from the group consisting of phenylenediamine, phenylenetriamine, cyclohexane triamine, cyclohexane diamine, piperazine and bi-piperidine.

Preferably, the polyamine monomer is an aromatic polyamine monomer comprising at least two amine groups, wherein the amine groups are directly attached to an aromatic ring. Typically the aromatic ring is an aromatic ring system comprising less than three aromatic rings, preferably the aromatic ring is phenyl. Preferably the at least one polyamine monomer is selected from phenylendiamin. Preferably at least one polyamine monomer is meta-phenylen diamine (MPD).

The at least one solvent S2 is preferably a polar solvent. Preferably, the at least one solvent S2 is selected from water and mixtures of water with at least one aliphatic $C_1$-$C_6$ alcohol. Preferably an aqueous solution of polyamine monomer is used according to the present invention, wherein the aqueous solvent comprises at least 50 wt %, preferably at least 70 wt %, preferably at least 90 wt %, more preferably at least 99 wt % water.

In a preferred embodiment the composition A1 comprises from 0.5 to 5 wt % of at least one polyamine monomer selected from the group consisting of phenylenediamine, phenylenetriamine, cyclohexane triamine, cyclohexane diamine, piperazine, and bipiperidine and at least one solvent S2 comprising at least 50 wt % water.

A polyacylhalide monomer in terms of the present invention is a compound having at least two acyl halide (also known as an acid halide) groups, wherein an acyl halide group is derived from a carboxylic acid group by replacing a hydroxyl group with a halide group. The halide may be selected from fluorine, chlorine, bromine or iodine. Preferably the polyacylhalide monomer is a polyacylchloride.

Preferably an aromatic polyacylhalide comprising at least two acyl halide groups (preferably two or three acyl halide groups) is employed in the inventive method, wherein the acyl halide groups are directly attached to an aromatic ring. Typically the aromatic ring is an aromatic ring system comprising less than three aromatic rings. In particular the aromatic ring is phenyl, biphenyl, naphthyl, preferably phenyl. Preferably the at least one polyacylhalide is selected from acyl halides based on aromatic polycarboxylic acids, e.g. phthalic acid, isophthalic acid (meta-phthalic acid), terephthalic acid (para-phthalic acid). Preferably the at least one polyacylhalide is selected from phthaloyl chloride (1,2-benzenedicarbonyl chloride), isophthaloyl chloride (1,3-benzenedicarbonyl chloride), terephthaloyl chloride (TCL, 1,4-benzenedicarbonyl chloride), and trimesoyl chloride (TMC, 1,3,5-benzene-tri-carbonyl-trichloride).

The at least one solvent S3 is preferably a hydrocarbon solvent. Preferably the at least one solvent S3 is selected from the group consisting of $C_1$-$C_{12}$ alkane, $C_6$-$C_{12}$ cycloalkane, isoparaffinic liquid (z.B. Isopar®), $C_6$-$C_{12}$ arene (e.g. benzene, toluene). Preferably, the al least solvent S3 is selected from the group consisting of hexane, cyclohexane, heptane and benzene. More preferably n-hexane is used as solvent S3.

In a preferred embodiment the composition A2 comprises from 0.01 to 4 wt % of at least one polyacylhalide monomers selected from the group consisting of phthaloyl chloride (1,2-benzenedicarbonyl chloride), isophthaloyl chloride (1,3-benzenedicarbonyl chloride), terephthaloyl chloride (TCL, 1,4-benzenedicarbonyl chloride), and trimesoyl chloride (TMC, 1,3,5-benzene-tri-carbonyl-trichloride) and at least one solvent S3, preferably at least one hydrocarbon solvent S3.

In particular the invention is directed to a method for preparation of a composite membrane as described above, wherein bringing the substrate layer (S) into contact with a composition A1 and/or A2 in steps c and/or d is effected by immersing the substrate layer (S) in the composition A1 and/or composition A2. Preferably the remaining composition A1 and/or A2 on the substrate layer (S) after step c and/or d) are wiped out after immersing. Typically, the contacting time of substrate layer (S) in the composition A1 is in the range of 0.1 to 30 minutes (min). Typically, the contacting time of substrate layer (S) in the composition A2 is in the range of 5 to 240 seconds (s).

In the inventive method as mentioned above the substrate layer (S) and/or the composite membrane can optionally be treated in a conditioning step after the steps b and/or d, wherein conditioning steps can be selected from cleaning, washing, drying and cross-linking. Preferably after steps b the obtained substrate layer (S) is washed and dried. Preferably, after step d the composite membrane is washed and/or dried (e.g. in air) at a temperature in the range of 30 to 150° C., preferably at 50 to 100° C., preferably at 50 to 70° C. Typically the composite membrane is washed and/or dried for 10 s to 30 min.

The obtained composite membrane is typically washed and kept in water prior to use.

Furthermore, the present invention is directed to a process of forward osmosis comprising the following steps:
a) supplying a composite membrane described above;
b) bringing in contact the composite membrane with at least one aqueous draw solution on one side of composite membrane and with at least one aqueous feed solution on the other side of composite membrane, wherein water is transported from the feed to the draw solution.

The term "forward osmosis (FO)" in terms of the present invention describes a process, wherein the osmotic pressure as a driving force allows water to diffuse through a semipermeable membrane from the so called feed solution to a so called draw solution, wherein the feed solution exhibits a relatively lower salt concentration as the draw solution.

Further the present invention is directed to the use of inventive composite membrane in a forward osmosis process for waste water treatment, seawater desalination, concentration of pharmaceutical compositions, concentration of food compositions, and water reclamation from wastewaters, power generation and potable water reuse devices, preferably for waste water treatment and seawater desalination.

The present invention is described in more detail by the following examples.

EXAMPLE 1

Production of Substrate Layer (S) Based on Sulfonated Polyarylethers

A casting solution of a polyethersulfon (PESU) (polymer P2) and a sulfonated copolymer (polymer P1) of a polyethersulfon (PESU) and a polyphenylensulfone PPSU showing a ratio of said polymers of 50/50 wt % was produced.

The polyethersulfone (polymer P2) was produced using the monomers dichlorodiphenylsulfone (DCDPS) and dihydroxy-diphenylsulfone (DHDPS) and comprised recurring units according to formula (3).

The sulfonated polyethersulfon/polyphenylensulfone copolymer (polymer P1) comprised recurring units according to the formula (12), wherein the sulfonated copolymer (polymer P1) exhibits 11.5 wt % of sulfonated units (sulfonated PPSU units) based on the weight of polymer P1.

A casting solution of 8 wt % of PESU (polymer P2) and 8 wt % of sulfonated copolymer of PESU and PPSU (polymer P1) was prepared by dissolving according amounts of said polymers in N-methylpyrrolidone (NMP>99.5%) under addition of 16 wt % ethylene glycol (EG). After fully dissolved, the casting solution was kept overnight without stirring to remove bubbles.

The polymer solution (P) was then cast on a glass plate via phase inversion method using 60 micron casting knife to form a homogeneous membrane substrate. Thereafter, the as-cast membrane substrate layer was immersed in water to conduct solvent exchange process to form a hydrophilic porous substrate. The resultant membrane was further washed with tap water for 1 day to fully remove residual solvent.

Figure 1A:
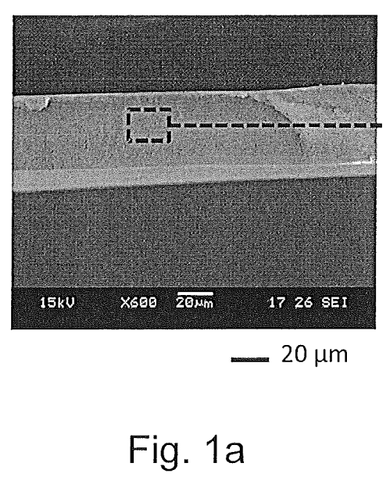
FIG. 1 shows the FESEM (Field Emission Scanning Electron Microscopy) picture of the cross section of the substrate layer (S) comprising 50 wt % sulfonated polymer P1
(a) cross section
(b) macrovoid-free sponge like structure (enlarged picture) of the substrate layer (S).
Figure 1B:
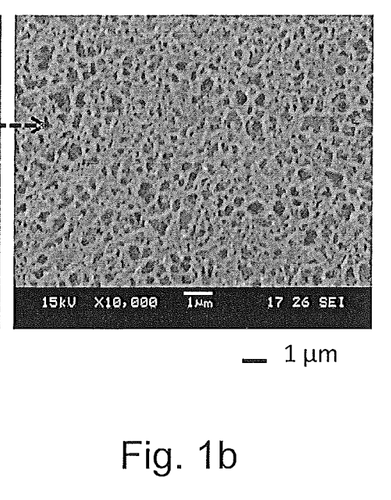

The morphology of as-cast membrane substrate (substrate layer (S)) was analyzed by scanning electron microscopy FESEM (top surface, bottom surface and cross section). FIGS. 1a and 1b show the cross section of substrate layer (S). It can be observed that the cross-section of membrane cast from 50/50 wt % polymer blends of PESU and sulfonated PESU/PPSU-copolymer exhibits a sponge-like porous structure with no macrovoids.

In addition, water permeability of the support membrane substrate (substrate layer (S)) using pure water and the molecular weight cut off (MWCO) were determined. The pure water permeability (PWP) of the support membrane substrate was 188.63 LMH (L/(m² hr) and molecular weight cut off (MWCO) was 414,829 Da.

EXAMPLE 2

Production of Thin Film Layer (F) onto Substrate Layer (S)

The substrate (substrate layer (S)) based on sulfonated polyarylethers as produced in Example 1 was used for formation of a thin polyamide layer (film layer (F)). The formation of a polyamide layer onto the substrate layer was based on the interfacial polymerization. The substrate layer was first immersed in 2 wt % of MPD (metaphenylendiamine) in deionized water (DI water) for 1 minute. Thereafter, filter paper was used to remove the water droplets in the membrane surface. Subsequently, the top surface of membranes was brought into contact with the 0.05 wt % TMC (trimesoyl chloride) solution in n-hexane for 15 seconds. The resultant membrane was dried at 60° C. for 1 minute, followed by drying in the air for 2 minutes. The resultant membrane was further cleaned in deionized water before use in forward osmosis process (FO). After this process, a thin polyamide film (film layer (F)) was formed on the substrate layer (S).

The morphology of membrane was analyzed by scanning electron microscopy (FESEM), wherein the cross section and top surface of thin film layer composite membrane were analyzed. It was observed that the thickness of thin polyamide film was approximately 150-200 nm.

RO (reversed osmosis) test for this composite membrane (at 50 psi and 400 ppm NaCl) showed PWP (pure water permeability) of 0.73±0.016 L/(m²·bar·hr) and salt rejection of 91±0.21%.

EXAMPLE 3

Forward Osmosis Process Using Thin Film Composite Membrane

The thin film composite membrane produced as described in Examples 1 and 2 was tested in a forward osmosis (FO) experiment.

Figure 2:
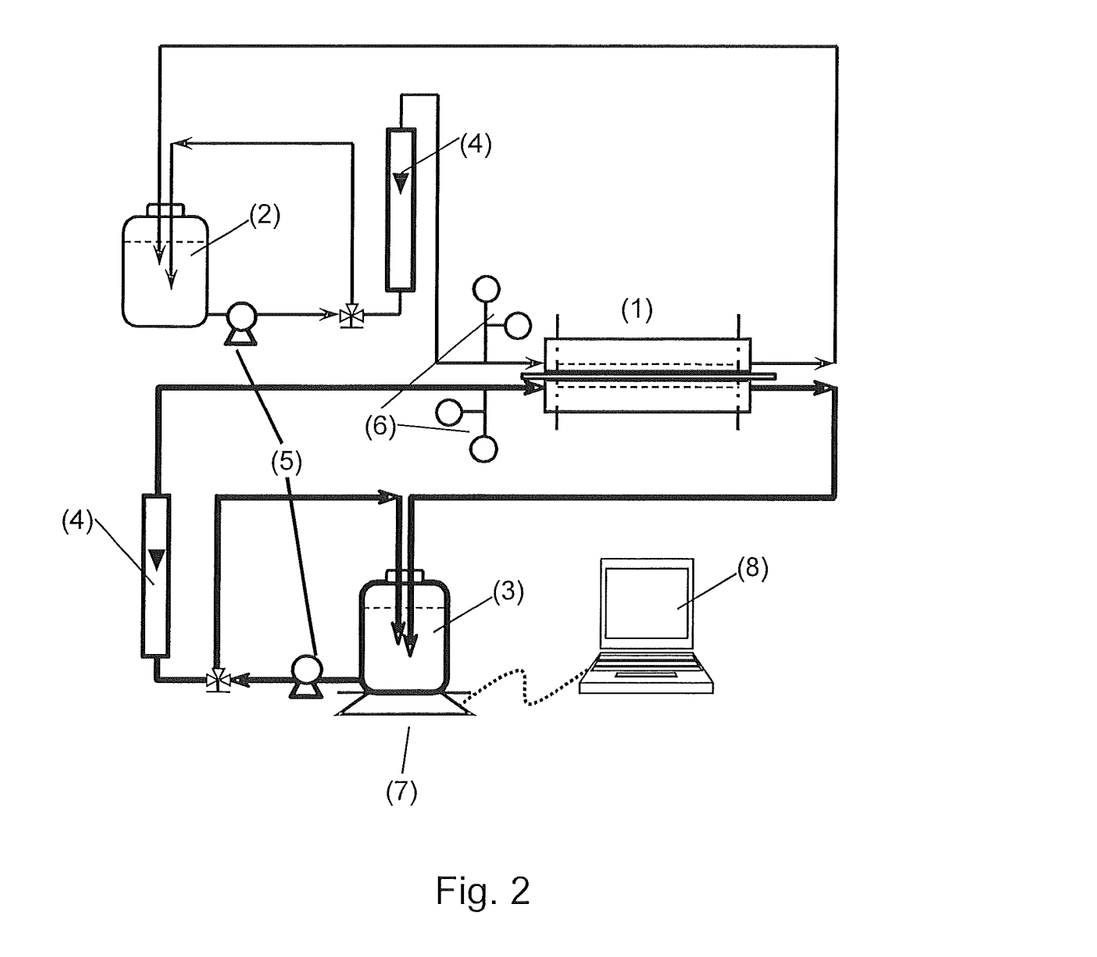
FIG. 2 shows schematically the layout of the lab-scale circulating filtration unit used for testing the composite membranes, wherein the references have the following meaning:
(1) crossflow permeation cell;
(2) feed solution in storage tank;
(3) draw solution in storage tank;
(4) flow meters;
(5) pumps;
(6) measurement devices of temperature and pressure;
(7) balance;
(8) computer.

FO experiments were conducted on a lab-scale circulating filtration unit. The schematic diagram of the filtration unit is shown in FIG. 2.

The crossflow permeation cell (1) was a plate and frame design with a rectangular channel on each side of the membrane. The feed solution (2) and the draw solution (3) were in storage tanks and circulated via pumps (5). The solution flows were adjusted using flow meters (4). The solution flow velocities during the FO process were kept at 6.4 cm/s for both feed solution (2) and draw solution (3) which was co-currently flowed through the cell channels. The temperature and the pressure of each solution were measured (6). The temperatures of the feed and draw solutions were maintained at 22±0.5° C. The pressures at two channel inlets were kept at 1.0 psi.

The membranes were tested under two different modes:
(1) draw solution against the dense selective layer (film layer (F)) (pressure retarded osmosis/PRO mode) and
(2) feed water side against the dense selective layer (film layer (F)) (FO mode).

The draw solutions with different concentrations were prepared from sodium chloride (NaCl) solutions and used in FO process. The change of draw solution concentration was ignored because the ratio of water permeation flux to the volume of the draw solution was less than 2% during the FO process.

Deionized water (DI water) was used as the feed solution. In this case the salt leakage can be calculated by measuring the conductivity in the feed solution at the end of experiment. A balance (7) (EK-4100i, A & D Company Ltd., Japan) connected to a Computer (8) recorded down the mass of water permeating into the draw solution over a selected period of time.

The water permeation flux was then calculated based on the weight changes of feed water. The water permeation flux $J_v$ (in $L \cdot m^{-2} \cdot h^{-1}$ (liter over square meter and hour) abbreviated as LMH) was calculated from the volume change of feed or draw solution using the following formula (f1):

$$J_v = \Delta V / (A \cdot \Delta t) \quad (f1)$$

wherein:
$\Delta V$ (in liter (L)) is the permeation water collected over a predetermined time $\Delta t$ (in hours (hr)) in the FO process duration;
A is the effective membrane surface area (in square meter $m^2$).

The salt concentration in the feed water was determined from the conductivity measurement in the feed solution using a calibration curve for the single salt solution. The salt leakage $J_s$, which is the salt back-diffusion from the draw solution to the feed solution (in $g \, m^{-2} \cdot h^{-1}$ (gram over square meter and hour) abbreviated as gMH), was thereafter determined from the increase of the feed conductivity using the following formula (f2):

$$J_s = \Delta(C_t \cdot V_t) / (A \cdot \Delta t) \quad (f2)$$

wherein:
$C_t$ and $V_t$ are the salt concentration and the volume of the feed at the end of FO process, respectively.

The water flux and salt leakage in the FO mode and the PRO mode with varying draw solution concentration (NaCl concentrations) are summarized in Table 1:

TABLE 1

Water flux and salt leakage of inventive composite membrane using DI water as feed in FO and PRO mode.

| Concentration of NaCl draw solution [mol/L] | FO mode | | PRO mode | |
|---|---|---|---|---|
| | Water flux [LMH] | Salt leakage [gMH] | Water flux [LMH] | Salt leakage [gMH] |
| 0.5 | 15 | 2.5 | 16 | 3 |
| 1 | 22 | 3.5 | 24 | 4.5 |
| 2 | 26 | 4.5 | 33 | 6 |
| 3 | 30 | 9 | 46.5 | 9 |
| 4 | 33 | 9 | 54 | 10 |
| 5 | 39 | 9.5 | 57 | 12.5 |

It was found that the water flux can reach 33 LMH with salt leakage <6 gMH for PRO mode with 2M NaCl as draw solution. At a higher draw solution concentration, i.e. 5M, the water flux can increase up to 57 LMH with salt leakage below 12.5 gMH for PRO mode.

EXAMPLE 4

Forward Osmosis Process Using Sea Water

A forward osmosis process using the thin film composite membrane produced as described in Examples 1 and 2 was carried out similar to Example 3 using seawater as feed solution instead of deionized water. The feed solution concentration consisted of 3.5 wt % NaCl and the draw solution concentration (NaCl) was varied from 2 M (mol/L) to 5 M (mol/L).

The water flux in the FO mode and the PRO mode using varying draw solution concentration (NaCl) are summarized in Table 2:

TABLE 2

Water flux of inventive composite membrane using sea water (3.5 wt % NaCl solution) as feed in FO and PRO mode.

| Concentration of NaCl draw solution [mol/L] | FO mode Water flux [LMH] | PRO mode Water flux [LMH] |
|---|---|---|
| 2 | 13.5 | 15 |
| 3 | 19.5 | 21 |
| 4 | 22.5 | 25.5 |
| 5 | 25.5 | 27.0 |

It can be found that the water flux of thin film composite FO membrane can reach 15 LMH using 2M NaCl as draw solution tested under PRO mode.

EXAMPLE 5

For comparison thin film membranes with 0 or 25 wt % sulfonated copolymer in the support material (substrate layer (S)) were prepared analogously to Examples 1 and 2 and tested in a forward osmosis process according to Example 3. The polymers P1 and P2 as described in Example 1 were used (sulfonated PESU/PPSU-copolymer having 11.5 wt % of sulfonated units and unsulfonated PESU). The following casting solutions were used:

Sample 1 (0 wt % sulfonated copolymer):
  16 wt % of unsulfonated PESU (polymer P2)
  16 wt % of ethylene glycol (EG)
  68 wt % N-methylpyrrolidone (NMP)
Sample 2 (25 wt % sulfonated copolymer):
  12 wt % of unsulfonated PESU (polymer P2)
  4 wt % of sulfonated PESU/PPSU-copolymer (polymer P1)
  16 wt % ethylene glycol (EG)
  68 wt % N-methylpyrrolidone (NMP)
Sample 3 (50 wt % sulfonated polymer see Example 1):
  8 wt % of unsulfonated PESU (polymer P2)
  8 wt % of sulfonated PESU/PPSU-copolymer (polymer P1)
  16 wt % ethylene glycol (EG)
  68 wt % N-methylpyrrolidone (NMP)

The casting procedure of these membrane support materials from different polymer solutions followed Example 1. Thereafter, the interfacial polymerization was carried on each resultant support materials using the same method as described in Example 2.

A forward osmosis process as described in Example 3 using deionized water as feed solution and 2 M sodium chloride (NaCl) solution as draw solution was carried out using said membranes. The data concerning water flux and salt leakage are summarized in Table 3:

TABLE 3

Water flux and salt leakage of different composite membranes using DI water as feed in FO and PRO mode.

| Sample | Support material | PRO mode | | FO mode | |
| | | Water flux [LMH] | Salt leakage [gMH] | Water flux [LMH] | Salt leakage [gMH] |
|---|---|---|---|---|---|
| 1 | 0 wt % sulfonated polymer | 13.5 | 3.7 | 10.5 | 3.1 |
| 2 | 25 wt % sulfonated polymer | 21.0 | 3.7 | 16.5 | 3.1 |
| 3 | 50 wt % sulfonated polymer (according to Example 1) | 33.0 | 6 | 26.0 | 4.5 |

It was found that thin film composite membrane with 0 wt % of sulfonated polymer in the membrane substrate layer (S) results in lower water fluxes as compared to that with 25 wt % or 50 wt % sulfonated content in the substrate layer (S). In addition, the composite membranes were analyzed using scanning electron microscopy. The thin film composite membranes with 0 wt % sulfonated polymer content in the membrane substrates showed finger-like macrovoid formation in the membrane cross section.

The invention claimed is:
1. Composite membrane comprising:
   a) at least one substrate layer (S) comprising
      i) at least one sulfonated polymer P1, which comprises from 2 to 40 wt %, based on the total weight of the polymer P1, of recurring units comprising at least one sulfonic acid group;
      ii) at least one polymer P2,
   wherein the sulfonated polymer P1 and the polymer P2 are independently selected from the group consisting of polyarylether, polyethersulfone, polyphenylensulfone, polysulfone, polyacrylonitrile, polybenzimidazole, polyetherimide polyphenyleneoxide, polyvinylidenfluoride, polyimide and copolymers composed of at least two recurring units of said polymers;
   wherein the weight ratio of sulfonated polymer P1 to polymer P2 is in the range of 0.4 to
   b) at least one film layer (F) comprising at least one polyamide.
2. Composite membrane according to claim 1, wherein the at least one sulfonated polymer P1 and the at least one polymer P2 are polyarylethers comprising recurring units according to following formula (1):

$$\text{---}[\text{O}\text{---}\text{Ar}\text{---}(\text{T}\text{---}\underset{}{\bigcirc})_t\text{---}\text{O}\text{---}\underset{}{\bigcirc}\text{---}\text{Z}\text{---}(\text{Ar}^1\text{---}\text{Q})_q\text{---}\underset{}{\bigcirc}]_x \quad (1)$$

where in:
  x is 0.5 or 1;
  t and q are each, independently of one another, 0, 1, 2 or 3;
  Q, T, Z are each, independently of one another, a chemical bond or a group selected from among —O—, —S—, —SO$_2$—, S=O, C=O, —N=N—, —R$^a$C=CR$^b$— and —CR$^c$R$^d$—; where

$R^a$ and $R^b$ are each, independently of one another, a hydrogen atom or a $C_1C_{12}$-alkyl group; and $R^c$ and $R^d$ are each, independently of one another, a hydrogen atom or a $C_1$-$C_{12}$-alkyl, $C_1$-$C_{12}$-alkoxy or $C_6$-$C_{18}$-aryl group, where $R^c$ and $R^d$ are optionally substituted independently by fluorine and/or chlorine atoms or may together with the carbon atom to which they are bound form a $C_3$-$C_{12}$-cycloalkyl group which is optionally substituted by one or more $C_1$-$C_6$-alkyl groups, with the proviso that at least one of the groups T, Q and Z is —$SO_2$— or C=O and, when t and q are each 0, Z is —$SO_2$— or C=O,

Ar, $Ar^1$ are each, independently of one another, a $C_6$-$C_{18}$-arylene group which is optionally substituted by one or more groups selected from $C_1$-$C_{12}$-alkyl, $C_6$-$C_{18}$-aryl, $C_1$-$C_{12}$-alkoxy group, halogen atom and sulfonic acid group.

3. Composite membrane according to claim 1, wherein the at least one sulfonated polymer P1 and the at least one polymer P2 are polyarylethers composed of recurring units according to following formula (1):

(1)

wherein:
is 0.5 or 1;
t and q, are each, independently of one another, 0, 1, or 2;
Q, T, Z are each, independently of one another, a chemical bond or a group, selected from —O— and —$SO_2$—;
with the proviso that at least one of the groups T, Q, and Z is —$SO_2$— and, if t and q are 0, Z is —$SO_2$—, and
Ar, $Ar^1$ are each, independently of one another, a $C_6$-$C_{12}$-arylene group, which is optionally substituted by one or more sulfonic acid groups.

4. Composite membrane according to claim 1, wherein the at least one sulfonated polymer P1 is a block copolymer comprising at least one polyethersulfone segment and at least one polyphenylensulfone segment according to following formula (12):

(12)

wherein:
n is an integer from 3 to 1500;
m is an integer from 3 to 1500;
a and b independently of one another, are an integer from 0 to 2, with the proviso that both a and b are not 0.

5. Composite membrane according to claim 1, wherein the at least one polymer P2 is a polyethersulfone composed of recurring units according to the following formula (3):

(3)

6. Composite membrane according to claim 1, wherein the at least one polyamide is an aromatic polyamide, in which at least 85% of amide groups are attached directly to two aromatic rings.

7. Method for preparation of a composite membrane according to claim 1, which comprises at least one substrate layer (S) and at least one film layer (F), comprising the following steps:

a) preparing a polymer composition P comprising:
i) at least one sulfonated polymer P1, which comprises from 2 to 40 wt %, based on the total weight of the polymer P1, of recurring units comprising at least one sulfonic acid group;
i) at least one polymer P2;
ii) at least one solvent S1;
iv) optional at least one further additive selected from the group consisting of ethylene glycol, diethylene glycol, polyethylene glycol, glycerol, methanol, ethanol, isopropanol and polyvinylpyrrolidon;
wherein the sulfonated polymer P1 and the polymer P2 are independently selected from the group consisting of polyarylether, polyethersulfone, polyphenylensulfone, polysulfone, polyacrylonitrile, polybenzimidazole, polyetherimide polyphenyleneoxide, polyvinylidenfluoride, polyimide and copolymers composed of at least two recurring units of said polymers;
and wherein the weight ratio of sulfonated polymer P1 to polymer P2 is in the range of 0.4 to 1.5;
b) separating the polymers P1 and P2 from the solvent S1 to form a substrate layer (S);
c) bringing the substrate layer (S) into contact with a composition A1 comprising at least one polyamine monomer having at least two amine groups and at least one solvent S2;
d) bringing the substrate layer (S) into contact with a composition A2 comprising at least one polyacylhalide monomer having at least two acyl halide groups and at least one solvent S3 to form a film layer (F) onto the substrate layer (S), wherein a composite membrane is obtained.

8. Method for preparation of a composite membrane according to claim 7, wherein the polymer composition P comprises:
i) 2.5 to 22.5 wt % of at least one sulfonated polymer P1;
ii) 2.5 to 15 wt % of at least one polymer P2;

iii) 62.5 to 95 wt % of at least one solvent S1 selected from the group consisting of N-methylpyrrolidone, N-dimethylacetamide, dimethylsulfoxide, dimethylfamiamide, triethylphosphate, tetrahydrofuran, 1,4-dioxane, and methyl ethyl ketone;

iv) optional 0-30 wt % of at least one further additive selected from the group consisting of ethylene glycol, diethylene glycol, polyethylene glycol, glycerol, methanol, ethanol, isopropanol and polyvinylpyrrolidon.

9. Method for preparation of a composite membrane according to claim 8, wherein the separating of the polymers P1 and P2 from the solvent S1 in step b is effected by:
applying the polymer composition P into a support;
adding a coagulation composition C comprising at least one $C_1$-$C_{12}$ aliphatic alcohol and/or water to the polymer composition P by forming the substrate layer S.

10. Method for preparation of a composite membrane according to claim 7, wherein the composition A1 comprises from 0.5 to 5 wt % of at least one polyamine monomer selected from the group consisting of phenylenediamine, phenylenetriamine, cyclohexane triamine, cyclohexane diamine, piperazine, and bi-piperidine and at least one solvent S2 comprising at least 50 wt % water.

11. Method for preparation of a composite membrane according to claim 7, wherein the composition A2 comprises from 0.01 to 4 wt % of at least one polyacylhalide monomer selected from the group consisting of phthaloyl chloride, isophthaloyl chloride, terephthaloyl chloride and trimesoyl chloride and at least one hydrocarbon solvent S3.

12. Method for preparation of a composite membrane according to claim 7, wherein bringing the substrate layer (S) into contact with a composition A1 and/or A2 in steps c and/or d is effected by immersing the substrate layer (S) in the composition A1 and/or composition A2.

13. Process of forward osmosis comprising the following steps:
a) supplying a composite membrane according to claim 1;
b) bringing the composite membrane in contact with at least one aqueous draw solution on one side of composite membrane and with at least one aqueous feed solution on the other side of composite membrane, wherein water is transported from the feed to the draw solution.

14. Process according to claim 13 for use in waste water treatment, seawater desalination, concentration of pharmaceutical compositions, concentration of food compositions, water reclamation from wastewaters, power generation and potable water reuse devices.

* * * * *

UNITED STATES PATENT AND TRADEMARK OFFICE
CERTIFICATE OF CORRECTION

PATENT NO.         : 9,193,611 B2
APPLICATION NO.    : 13/457682
DATED              : November 24, 2015
INVENTOR(S)        : Weber et al.

Page 1 of 1

It is certified that error appears in the above-identified patent and that said Letters Patent is hereby corrected as shown below:

In the Claims:

Claim 1, column 20, line 46, "wherein the weight ration sulfonated polymer P2 is the range of 0.4 to" should read --wherein the weight ratio of sulfonated polymer P1 to polymer P2 is in the range of 0.4 to 1.5--.

Signed and Sealed this
Twelfth Day of April, 2016

Michelle K. Lee
*Director of the United States Patent and Trademark Office*